(12) United States Patent
Mussman et al.

(10) Patent No.: US 10,530,785 B1
(45) Date of Patent: *Jan. 7, 2020

(54) METHOD AND SYSTEM FOR MESSAGE DELIVERY SECURITY VALIDATION

(71) Applicant: West Corporation, Omaha, NE (US)

(72) Inventors: David C Mussman, Omaha, NE (US); Ronald Wayne Mathis, Longmont, CO (US); Bruce Andersen, LaGrange Park, IL (US)

(73) Assignee: West Corporation, Omaha, NE (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/942,713

(22) Filed: Apr. 2, 2018

Related U.S. Application Data

(63) Continuation of application No. 15/484,328, filed on Apr. 11, 2017, now Pat. No. 9,935,966, which is a continuation of application No. 14/931,489, filed on Nov. 3, 2015, now Pat. No. 9,621,564, which is a continuation of application No. 12/535,920, filed on Aug. 5, 2009, now Pat. No. 9,178,858.

(51) Int. Cl.
  *H04L 29/06* (2006.01)

(52) U.S. Cl.
  CPC .......... *H04L 63/123* (2013.01); *H04L 63/061* (2013.01); *H04L 63/0876* (2013.01)

(58) Field of Classification Search
  CPC ..... H04L 63/123; H04L 63/105; H04L 63/08; H04L 63/0428
  USPC ....................................................... 713/170
  See application file for complete search history.

(56) References Cited

U.S. PATENT DOCUMENTS

| | | | | |
|---|---|---|---|---|
| 7,873,988 B1* | 1/2011 | Issa | ......................... | G06F 21/10 726/26 |
| 2003/0125977 A1* | 7/2003 | Morioka | ................ | G06Q 30/02 705/26.1 |
| 2004/0098609 A1* | 5/2004 | Bracewell | ............ | H04L 63/068 726/6 |
| 2004/0123159 A1* | 6/2004 | Kerstens | ................. | H04L 29/06 726/12 |
| 2004/0250082 A1* | 12/2004 | Li | ......................... | H04L 9/3247 713/181 |
| 2005/0005146 A1* | 1/2005 | Kryeziu | ................... | G06F 21/10 713/193 |
| 2006/0242411 A1* | 10/2006 | Lin | ..................... | H04L 63/0442 713/171 |
| 2007/0074270 A1* | 3/2007 | Meehan | ................... | G06F 21/10 726/2 |
| 2007/0220591 A1* | 9/2007 | Damodaran | .......... | H04L 9/0643 726/4 |
| 2007/0255790 A1* | 11/2007 | Weksler | ................. | H04L 63/08 709/206 |
| 2008/0043942 A1* | 2/2008 | Cardona | ............... | H04L 51/063 379/88.18 |

(Continued)

*Primary Examiner* — Teshome Hailu

(57) ABSTRACT

A method, a system, and computer readable medium comprising instructions for message delivery security validation are provided. At least one authentication setting from an end user is received at a data collection system. A validation key is generated based on the at least one authentication setting. A message and the validation key are sent to a device of a recipient. The device of the recipient are automatically authenticated using the validation key. The message is delivered to the device of the recipient upon authentication.

20 Claims, 8 Drawing Sheets

(56) References Cited

U.S. PATENT DOCUMENTS

2008/0187140 A1\* 8/2008 McGillian ............. H04L 63/062
                                                          380/278
2009/0138711 A1\* 5/2009 Heimbigner ............ H04L 51/12
                                                          713/170

\* cited by examiner

US 10,530,785 B1

METHOD AND SYSTEM FOR MESSAGE DELIVERY SECURITY VALIDATION

CROSS-REFERENCE TO RELATED APPLICATIONS

The present application is a continuation of and claims priority from patent application Ser. No. 15/484,328, titled METHOD AND SYSTEM FOR MESSAGE DELIVERY SECURITY VALIDATION, filed Apr. 11, 2017, which is a continuation of and claims priority from patent application Ser. No. 14/931,489, titled METHOD AND SYSTEM FOR MESSAGE DELIVERY SECURITY VALIDATION, filed Nov. 3, 2015, now issued U.S. Pat. No. 9,621,564, which is a continuation of and claims priority from patent application Ser. No. 12/535,920, titled METHOD AND SYSTEM FOR MESSAGE DELIVERY SECURITY VALIDATION, filed Aug. 5, 2009, now issued U.S. Pat. No. 9,178,858, the entire contents of which are enclosed by reference herein.

FIELD OF THE DISCLOSURE

The present disclosure relates generally to a mobile communications system. More particularly, the present disclosure provides a method, a system, and a computer readable medium comprising instructions for message delivery security validation in a mobile communications system.

BACKGROUND OF THE DISCLOSURE

In today's environment, most messages may be delivered in a mobile communications system in an unsecured manner. For example, an end user may designate a message with data to be delivered to a recipient based on the recipient's phone number. However, no security mechanism currently exists that ensures the recipient's device is the one designated by the end user. Without verifying that the recipient device, a device other than the one designated by the end user may receive the message. In addition, the security of message delivery is weak in that the end user may not select security settings for each message delivered.

Alternatively, some recipient devices validate the recipient user by notifying the recipient user that a message has arrived and requiring the recipient user to enter a password or username for delivery. This type of validation, however, is not cost effective as the recipient user is charged for any inbound message received regardless of whether it is designated for the recipient user. In addition, this type of validation disrupts ordinary operations performed by the recipient user when the user is notified each time a message has arrived.

Therefore, what is needed is a method and system for message delivery security validation, such that end users may specify security authentication for the message and recipient devices be automatically validated as the message is delivered.

SUMMARY OF THE DISCLOSURE

A method for message delivery security validation is provided. At least one authentication setting from an end user is received at a data collection system. A validation key is generated based on the at least one authentication setting. A message and the validation key are sent to a device of a recipient. The device of the recipient are automatically authenticated using the validation key. The message is delivered to the device of the recipient upon authentication.

In one embodiment, the message and the validation key are received from a data collection system. A determination is made as to whether the validation key is recognized. The message is delivered to the device of the recipient if the validation key is recognized.

In an alternative embodiment, the message and the validation key are received from a data collection system. A determination is made as to whether a quick response code is attached to the validation key. The message is placed up in priority for delivery if the quick response code is attached to the validation key.

In yet another embodiment, the message and the validation key are received from a data collection system. A determination is made as to whether a quick response code is attached to the validation key. The recipient is prompted for a quick response if the quick response code is attached to the validation key.

In still yet another embodiment, the message and the validation key are received from a data collection system. A determination is made as to whether the validation key is recognized. The message is returned to the data collection system if the validation key is not recognized.

DETAILED DESCRIPTION OF THE INVENTION

Figure 1:
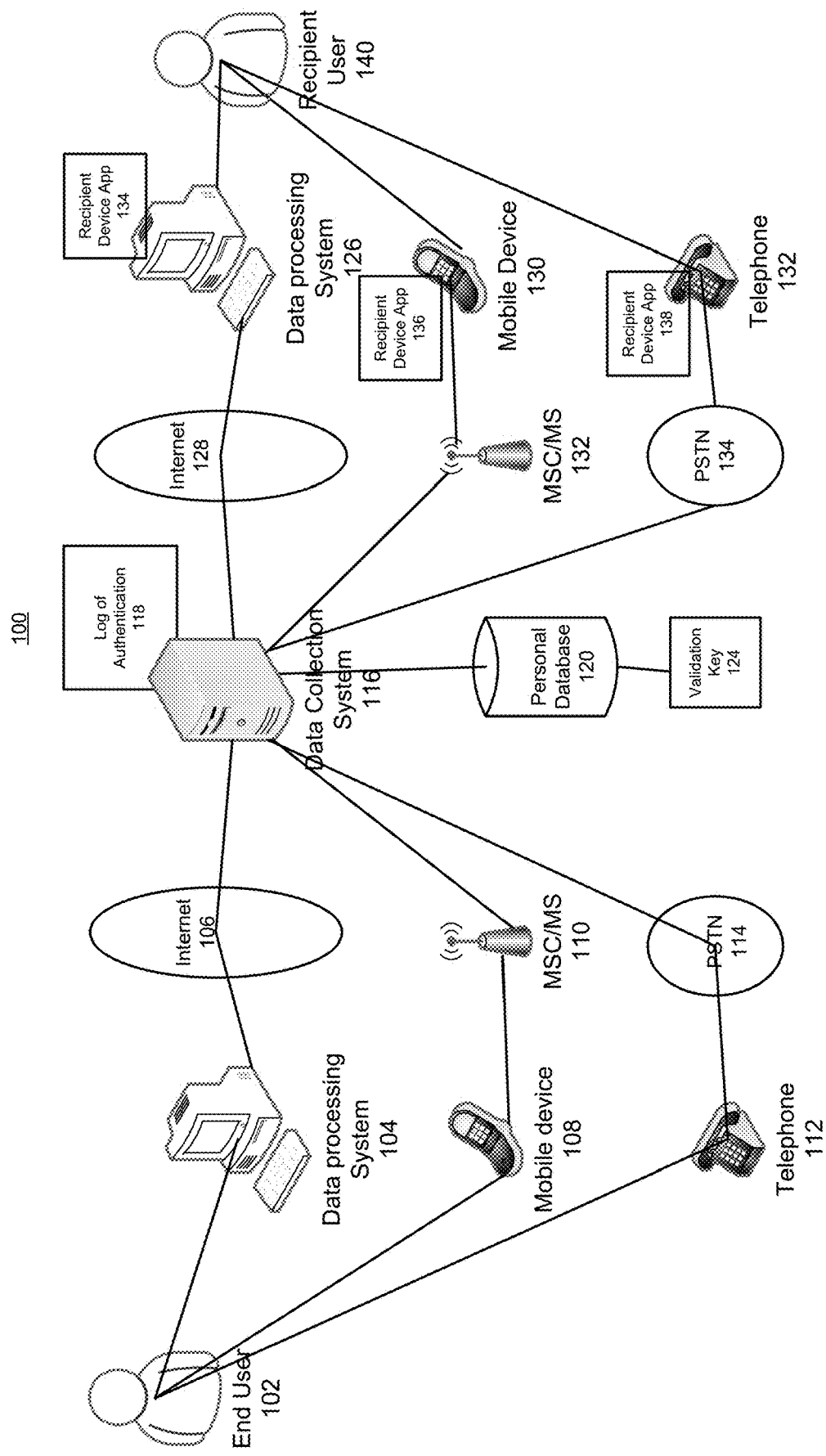
FIG. 1 depicts a diagram of a system for message delivery security validation in accordance with one embodiment of the present disclosure.

With reference to the figures and in particular with reference to FIG. 1, a diagram of a system for message delivery security validation is depicted in accordance with one embodiment of the present disclosure. In mobile communications system 100, an end user 102 may initiate a voice or data communication with a recipient user 140 for delivery of a message. To initiate a voice or data communication, end user 102 may dial a number of the recipient user 140 using a data processing system 104 via the Internet 106. Examples of data processing system 102 include a laptop computer, a desktop computer, a server, or other types of systems capable of sending and receiving information via a wireless or wired protocol.

Alternatively, end user 102 may dial a number of the recipient user 140 using a mobile device 108, which connects to the recipient user 140 via a mobile switching center or mobile station 110. In addition, end user 102 may dial the number of recipient user 140 using a telephone 112, which connects to the recipient user 140 via a public service telephone network 114. Alternatively, telephone 112 may be an Internet Protocol-enabled phone, which sends the message to recipient user 140 via the Internet protocol.

Mobile communication system 100 also includes a data collection system 116, which allows end user 102 to define various authentication settings for recipient user 140. The authentication settings may be stored in an authentication log 118. More information regarding security authentication settings are discussed with reference to FIG. 5 below.

Once security authentication settings are defined by end user 102, data collection system 116 connects to personal database 120, which comprises personal information of various recipients, and generates a validation key 124 for the recipient user 140. In one embodiment, the validation key is generated based on the authentication settings provided by the end user 102 and personal data within personal database 120. Alternatively, the validation key may be generated based on personal data or authentication settings alone.

Once the validation key is generated, the data collection system 116 sends the validation key and the data message to a recipient device. Examples of recipient device include data processing system 126, mobile device 130, or telephone 132. If the recipient device is data processing system 126, the message and validation key may be sent via the Internet 128. If the recipient device is a mobile device 130, the message and validation key may be sent via a mobile switching center or mobile station 132. If the recipient device is a telephone, the message and validation key may be sent via a public service telephone network (PSTN).

When the message and validation key are received, the recipient device application, such as recipient device application 134, 146, and 138, determines if the validation key is recognized. If the validation key is recognized, the recipient device application delivers the received message to recipient user 140 without interruptions. In this way, the device may be automatically validated based on the authentication setting selected by the end user 102 and the message be delivered to the recipient user 140 without disrupting the recipient user 140.

It is noted that the data collection system 116 may be implemented as a standalone data processing system or server. Alternatively, the data collection system 116 may be integrated with data processing system 104 of end user 102 or data processing system 126 of recipient user 140 without departing from the spirit and scope of the present disclosure.

Figure 2:
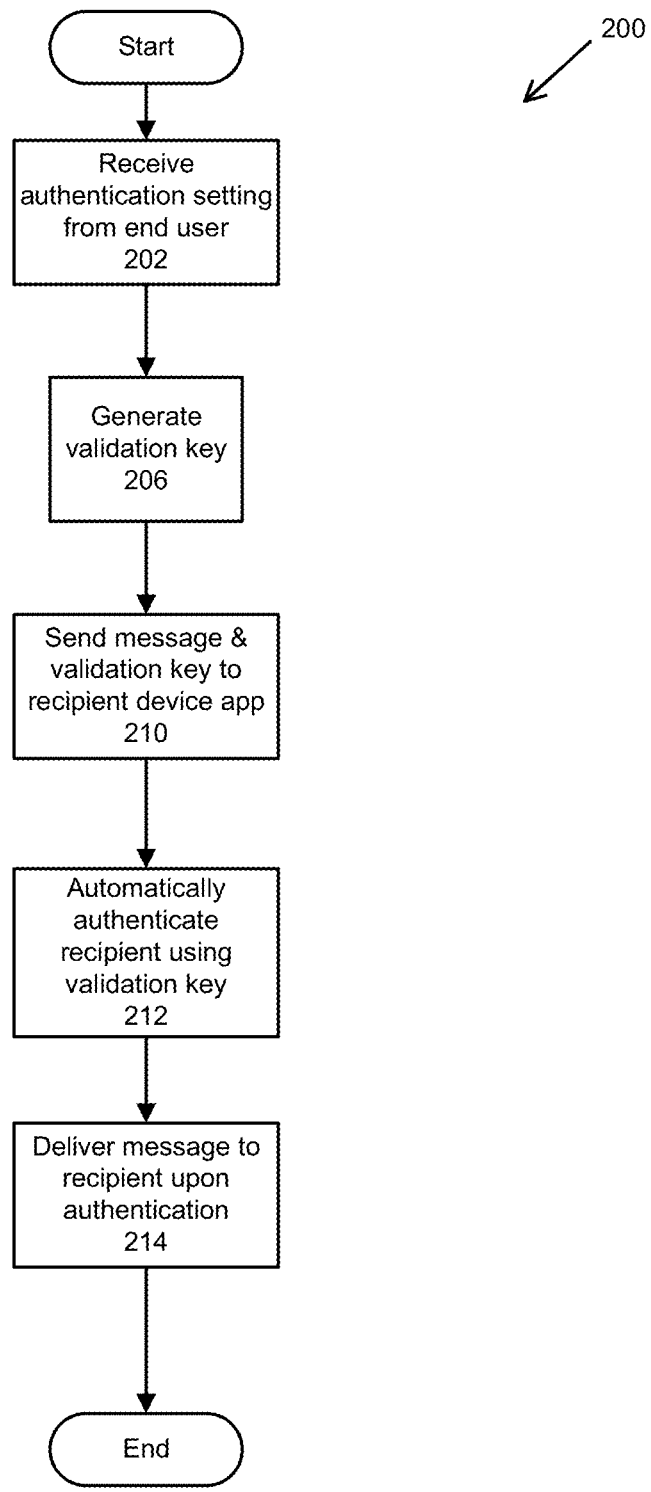
FIG. 2 depicts a flowchart of a process for message delivery security validation is depicted in accordance with one embodiment of the present disclosure.

Referring to FIG. 2, a flowchart of a process for message delivery security authentication is depicted in accordance with one embodiment of the present disclosure. Process 200 may be implemented as computer instructions embodied in a computer readable medium. Process 200 begins at step 202 to receive at least one authentication setting from an end user. The at least one authentication setting may be a security level and/or a type of authentication for the security level. Process 200 then continues to step 204 to generate a validation key based on the at least one authentication setting. Process 200 then continues to step 206 to send a message and the validation key to a device of a recipient. Process 200 then continues to step 208 to automatically authenticate the recipient using the validation key. Process 200 then completes at step 210 to deliver the message to the recipient upon authentication.

Figure 3:
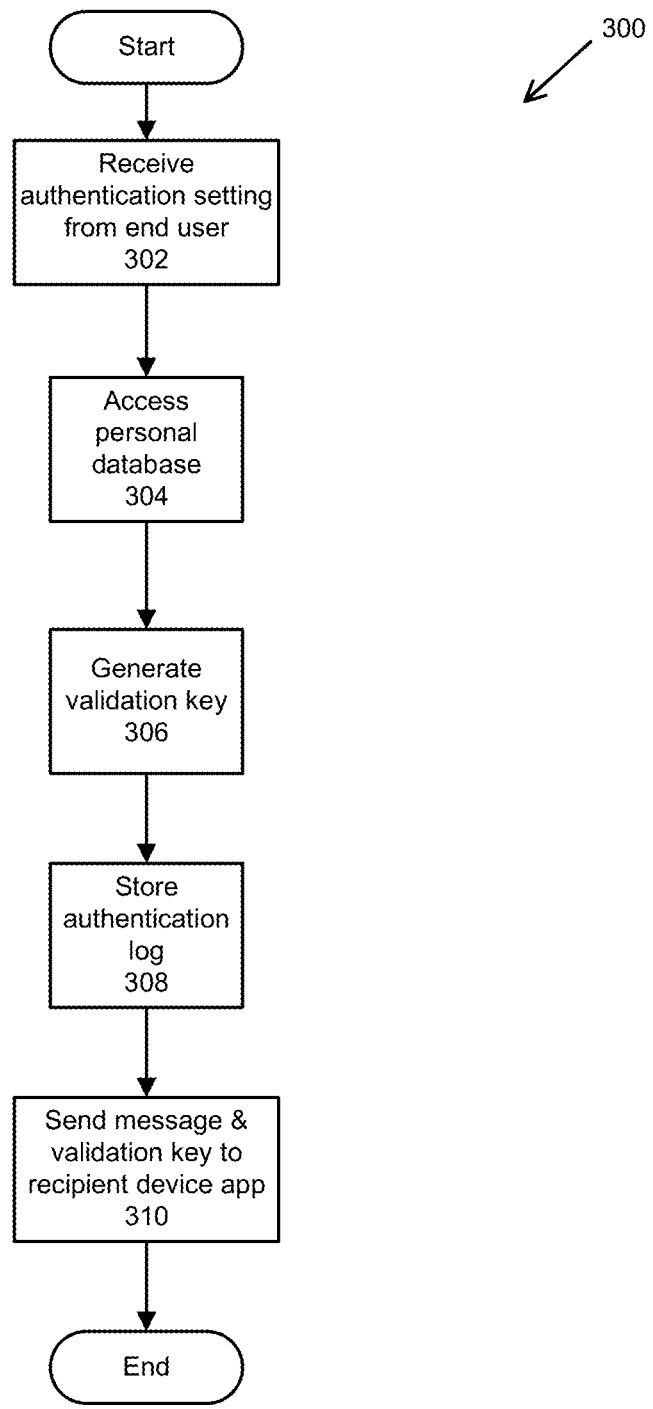
FIG. 3 depicts a flowchart of a process for generating validation key in accordance with one embodiment of the present disclosure.

Referring to FIG. 3, a flowchart of a process for generating validation key is depicted in accordance with one embodiment of the present disclosure. Process 300 may be implemented as computer instructions embodied in a computer readable medium. In this embodiment, process 300 may be implemented as computer instructions executing within data collection system 116.

Process 300 begins at step 302 to receive authentication settings from the end user. The end user may select one of many authentication levels from a menu and the type of authentication for the authentication level. More details regarding the authentication settings are discussed with reference to FIG. 5 below.

Process 300 then continues to step 304 to access personal data from the personal database. Personal data may include information about the recipient user. Process 300 then continues to step 306 to generate a validation key. The validation key may be generated from the authentication settings selected by the end user, the personal data, or a combination of the authentication settings and the personal data. Process 300 then continues to step 308 to store the authentication settings and validation key in an authentication log. After the validation key is generated and stored, process 300 completes at step 310 to send the message by the end user and the generated validation key to the recipient device.

Figure 4:
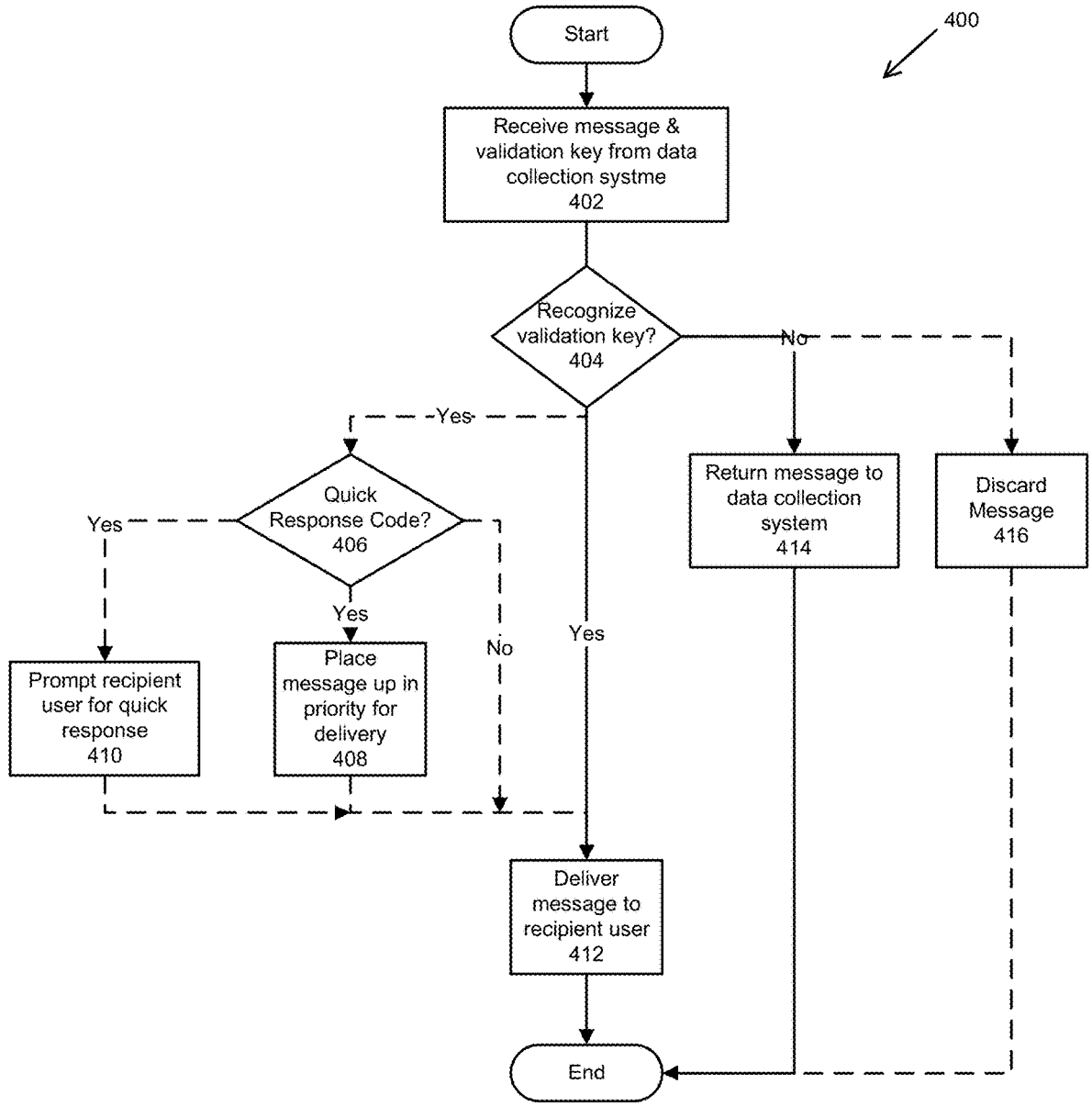
FIG. 4 depicts a flowchart of a process for authenticating recipient device with the validation key with one embodiment of the present disclosure.

Referring to FIG. 4, a flowchart of a process for authenticating recipient device with the validation key is depicted with one embodiment of the present disclosure. Process 400 may be implemented as computer instructions embodied in a computer readable medium. In this embodiment, process 400 may be implemented as computer instructions executing within recipient device applications, such as recipient device application 134, 136, and 138.

Process 400 begins at step 402 to receive the message and validation key from the data collection system 116. Process 400 then continues to step 404 to determine if the validation key received is recognized. In one embodiment, the validation key may be decrypted at the recipient device and compared with a recipient device key. If the validation key is recognized, process 400 completes at step 412 to deliver the message to the recipient user without interruptions.

In an alternative embodiment, process 400 continues to step 406 to determine if a quick response code is attached with the validation key. If a quick response code is attached, this means that a quick response is expected from the recipient user by the end user and process 400 continues to step 408 to place the message up in priority for delivery to the recipient user. Process 400 then completes at step 412 to deliver the message to the recipient user. By the placing the message up in priority for delivery to the recipient user, a quick response to the priority message may be expected from the recipient user.

In another alternative embodiment, instead of placing the message up in priority for delivery, process 400 continues to step 410 to prompt the recipient user for a quick response, even though this may cause interruption to the recipient user. Process 400 then completes at step 412 to deliver the message to recipient user. However, if no quick response code is attached at step 406, process 400 completes at step 412 to deliver the message to the recipient user. Returning to step 404, if the validation key is not recognized by the recipient device application, process 400 completes at step 414 to return the message back to the data collection system. Alternatively, instead of returning the message, process 400 completes at step 416 to discard the message.

Figure 5:
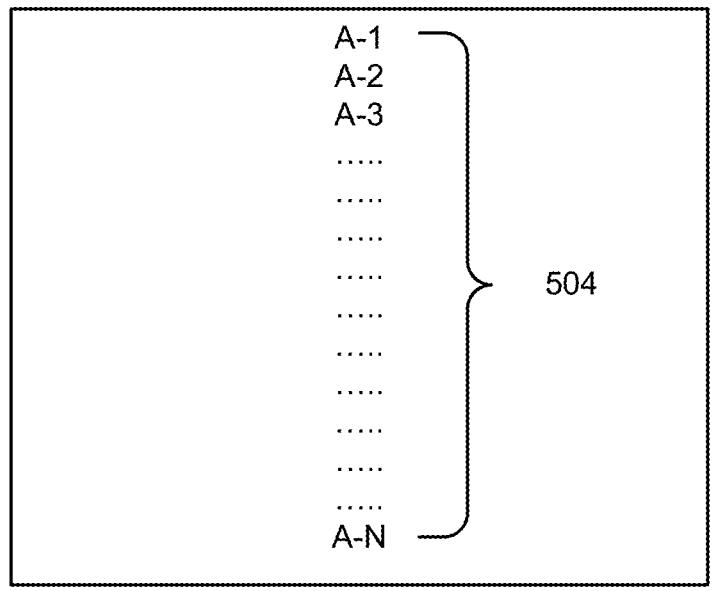
FIG. 5 depicts a diagram illustrating exemplary authentication settings in accordance with one embodiment of the present disclosure.

Referring to FIG. 5, a diagram illustrating exemplary authentication settings is depicted in accordance with one embodiment of the present disclosure. In this embodiment, a security level menu 502 is provided to the end user 102 for selection. In this example, the security level menu 502 comprises a plurality of security levels, from A-1 to A-N 504. The security level menu 502 may vary based on the message being sent by the end user.

For each selected security level, the end user may select one or more types of authentication 506. For example, an end user may select Biometric (D-1) as the type of authentication for security level A-1 and Passcode (D-2) as the type of authentication for security level A-2. In addition, the end user may select a combination of authentication types for a security level. For example, the end user may select a combination of passcode (D-2) and voice authentication (D-3) for security level A-3. It is noted that the types of authentication 506 as shown in FIG. 5 is for illustrative purposes only. Other types of authentication may be provided to the end user for selection without departing the spirit and scope of the present disclosure.

In addition to generating a validation key based on security settings selected by end user and automatically delivering the message to recipient user upon authentication, message delivery security validation may be performed in a reverse manner at the recipient device.

Figure 6:
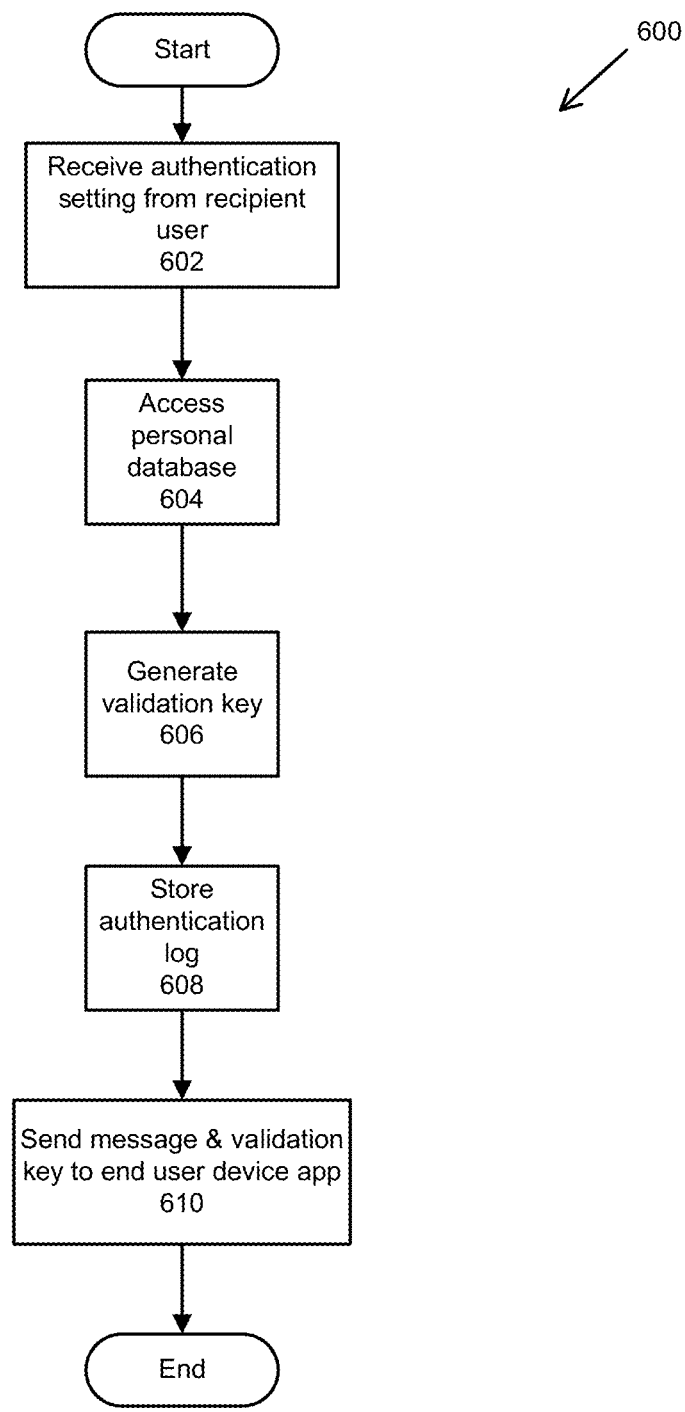
FIG. 6 depicts a flowchart of a process for generating a validation key in accordance with an alternative embodiment of the present disclosure.

Referring to FIG. 6, a flowchart of a process for generating a validation key is depicted in accordance with an alternative embodiment of the present disclosure. Process 600 may be implemented as computer instructions embodied in a computer readable medium. In this embodiment, process 600 may be implemented as computer instructions executing within data collection system 116.

Process 600 begins at step 602 to receive authentication settings from the recipient user. The recipient user may select one of many authentication levels from a menu and the type of authentication for the authentication level. Process 200 then continues to step 604 to access personal data from the personal database. Personal data may include information about the end user. Process 600 then continues to step 606 to generate a validation key. The validation key may be generated from the authentication settings selected by the recipient user, the personal data, or a combination of the authentication settings and the personal data. Process 600 then continues to step 608 to store the authentication settings and validation key in an authentication log. After the validation key is generated and stored, process 600 completes at step 610 to send the message by the recipient user and the generated validation key to the end user device.

Figure 7:
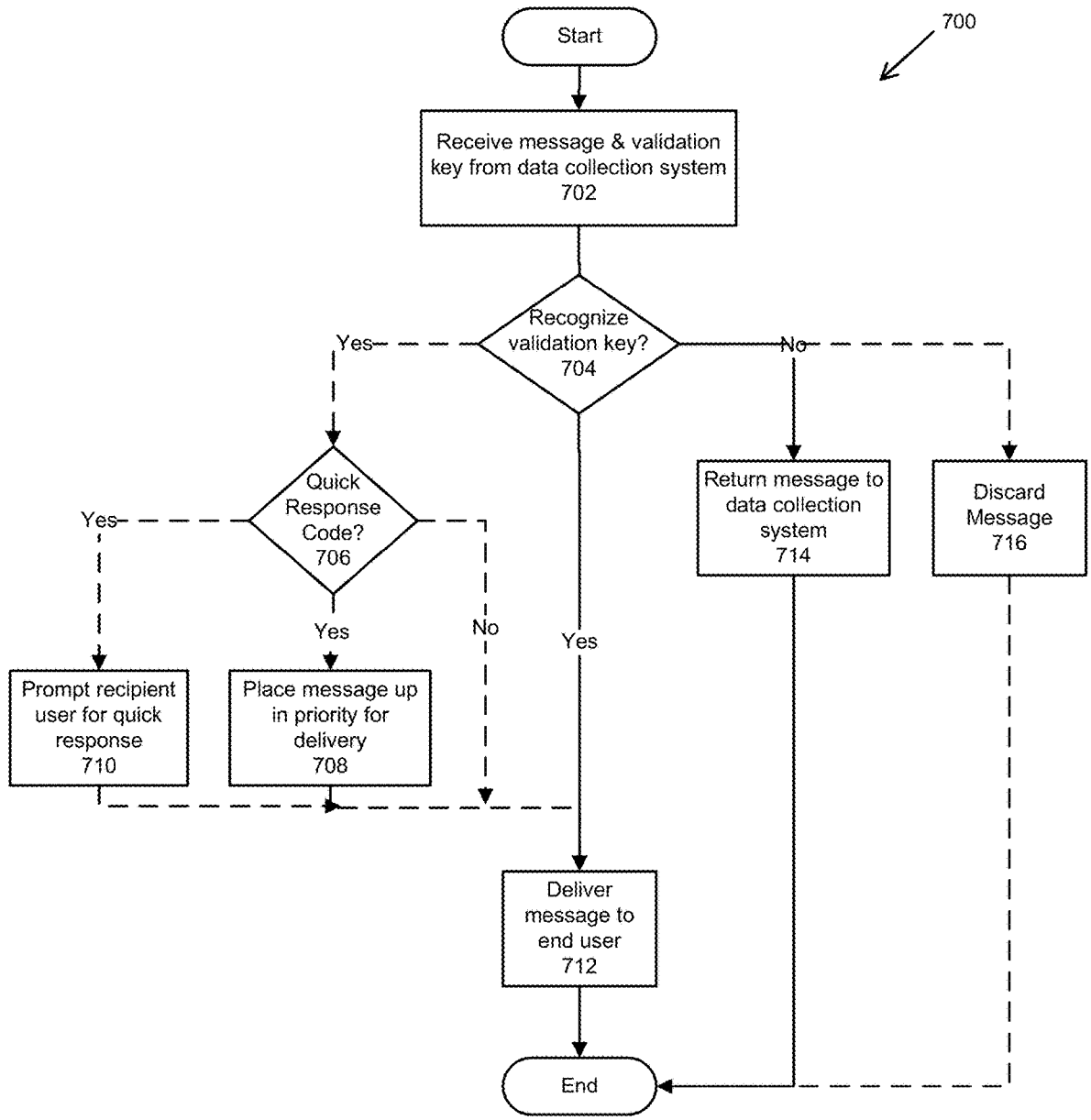
FIG. 7 depicts a flowchart of a process for authenticating recipient device with the validation key with an alternative embodiment of the present disclosure.

Referring to FIG. 7, a flowchart of a process for authenticating recipient device with the validation key is depicted with an alternative embodiment of the present disclosure. Process 700 may be implemented as computer instructions embodied in a computer readable medium. In this embodiment, process 700 may be implemented as computer instructions executing within device applications of end user devices, including data processing system 104, mobile device 108, and telephone 112.

Process 700 begins at step 702 to receive the message and validation key from the data collection system 116. Process 700 then continues to step 704 to determine if the validation key received is recognized. In one embodiment, the validation key may be decrypted at the end user device and compared with end user device key. If the validation key is recognized, process 700 completes at step 712 to deliver the message to the end user without interruptions.

In an alternative embodiment, process 700 continues to step 706 to determine if a quick response code is attached to the validation key. If a quick response code is attached, this means that a quick response is expected from the end user by the recipient and process 700 continues to step 708 to place the message up in priority for delivery to the end user. Process 700 then completes at step 712 to deliver the message to the end user. By the placing the message up in priority for delivery to the end user, a quick response to the priority message may be expected from the end user.

In another alternative embodiment, instead of placing the message up in priority for delivery, process 700 continues to step 710 to prompt the end user for a quick response, even though this may cause interruption to the end user. Process 700 then completes at step 712 to deliver the message to end user. However, if no quick response code is attached at step 706, process 700 completes at step 712 to deliver the message to the end user. Returning to step 704, if the validation key is not recognized by the end user device application, process 700 completes at step 714 to return the message back to the data collection system. Alternatively, instead of returning the message, process 700 completes at step 716 to discard the message.

Figure 8:
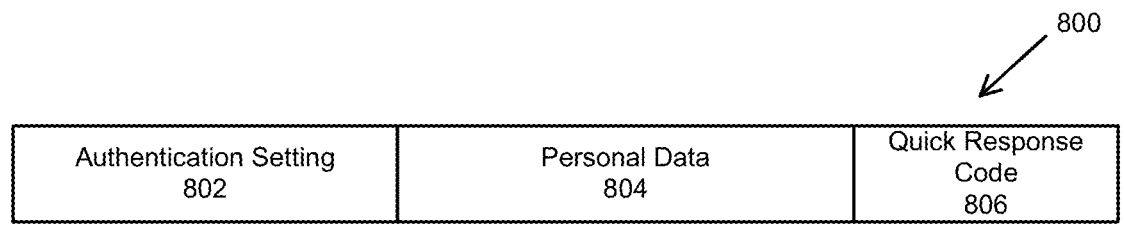
FIG. 8 depicts a diagram of an exemplary validation key in accordance with one embodiment of the present disclosure.

Referring to FIG. 8, a diagram of an exemplary validation key is depicted in accordance with one embodiment of the present disclosure. In this embodiment, validation key 800 may be generated by data collection system 116 after end user 102 or recipient user 140 selects a security level and authentication types. In this example, validation key 800 comprises an authentication setting field 802, which may include the security level and authentication types selected by end user or recipient user. In addition, validation key 800 comprises a personal data field 804, which may include personal data of the recipient user or end user necessary for authentication. Furthermore, validation key 800 may include a quick response code 806, which indicates to the receiving device application whether a quick response is expected from the sender. If a quick response code is expected, the message is placed up in priority for delivery. Otherwise, the message is delivered to the recipient user in the ordinary manner without interruptions.

In summary, the present disclosure provides a method, a system, and computer readable medium comprising instructions for message delivery security validation. By allowing the end user to select security levels and authentication types based on the message, the security of message delivery is increased. In addition, by generating a validation key and providing automatic validation of the validation key at the recipient device, only recipient designated by the end user may receive the message. In this way, message delivery is more secured and may be performed in a manner that does not create disruptions to the recipients.

Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

What is claimed is:

1. A method, comprising:
   receiving a validation key at a device of a recipient based on at least one authentication setting; and
   receiving a message at the device of the recipient when the validation key is recognized;
   wherein the at least one authentication setting comprises:
   at least one security level for the message;

at least one type of authentication for the security level; and is used for a certain security level of the at least one security level;

wherein the device of the recipient is prompted for a quick response when a quick response code is attached to the validation key; and wherein the quick response code places the message up in priority for quicker receipt.

2. The method of claim 1, when the validation key is not recognized, returning the message, by the device of the recipient, to a data collection system.

3. The method of claim 1, comprising generating the validation key which comprises:

accessing data from a personal database; and storing the validation key in an authentication log.

4. The method of claim 1, wherein the automatically determining, by the device of the recipient, of whether the validation key is recognized comprises receiving the message and the validation key from a data collection system.

5. The method of claim 1, wherein the automatically determining, by the device of the recipient, of whether the validation key is recognized comprises:

receiving the message and the validation key from a data collection system;

determining whether a quick response code is attached to the validation key; and placing the message up in priority for delivery whether the quick response code is attached to the validation key.

6. The method of claim 1, wherein the automatically determining, by the device of the recipient, of whether the validation key is recognized comprises:

receiving the message and the validation key from a data collection system; and determining whether a quick response code is attached to the validation key.

7. The method of claim 1, wherein the automatically determining, by the device of the recipient, of whether the validation key is recognized comprises receiving the message and the validation key from a data collection system.

8. The method of claim 1, wherein the automatically determining, by the device of the recipient, of whether the validation key is recognized comprises:

receiving the message and the validation key from a data collection system; and discarding the message when the validation key is not recognized.

9. The method of claim 1, wherein the determining of whether the validation key is recognized comprises:

comparing the validation key against a key of the device of the recipient; and recognizing the validation key when the validation key matches against the key of the device of the recipient.

10. The method of claim 1, wherein the delivering of the message to the recipient upon authentication comprises delivering the message to the recipient without interruption.

11. A system, comprising:

a recipient device configured to:

receive a validation key based on at least one authentication setting;

receive a message when a the validation key is recognized:

wherein the at least one authentication setting comprises:

at least one security level for the message;

at least one type of authentication for the security level; and is used for a certain security level of the at least one security level;

wherein the device of the recipient is prompted for a quick response when a quick response code is attached to the validation key and wherein the quick response code places the message up in priority for quicker receipt.

12. The system of claim 11, wherein the recipient device is communicably coupled to a data collection system.

13. The system of claim 11, wherein the recipient device is a data processing system, a mobile device, or a telephone.

14. The system of claim 11, wherein the data collection system is a data processing system or a server.

15. The system of claim 11, wherein the at least one authentication setting comprises at least one security level selected via the recipient device and at least one type of authentication for the at least one security level.

16. The system of claim 11, wherein a data collection system is configured to access data from a personal database and store the validation key in an authentication log.

17. The system of claim 11, wherein the recipient device is configured to receive the message and the validation key from a data collection system.

18. The system of claim 11, wherein the recipient device is configured to perform one or more of: receive the message and the validation key from a data collection system, and determine whether a quick response code is attached to the validation key.

19. A non-transitory computer readable medium comprising instructions configured to cause a processor to:

receive a validation key at a device of a recipient based on at least one authentication setting; and receive a message at the device of the recipient when the validation key is recognized;

wherein the at least one authentication setting comprises:

at least one security level for the message;

at least one type of authentication for the security level;

is used for a certain security level of the at least one security level;

wherein the device of the recipient is prompted for a quick response when a quick response code is attached to the validation key and wherein the quick response code places the message up in priority for quicker receipt.

20. The non-transitory computer readable medium of claim 19 comprising instructions configured to cause the processor to return the message to a data collection system when the validation key is not recognized.

* * * * *